United States Patent [19]

Keller, III

[11] 3,967,811

[45] July 6, 1976

[54] ALL PLASTIC VALVE CONSTRUCTION

[75] Inventor: Robert J. Keller, III, Richmond, Va.

[73] Assignee: Kel-Win Manufacturing Company, Inc., Chester, Va.

[22] Filed: Dec. 3, 1975

[21] Appl. No.: 637,135

[52] U.S. Cl. .............................. 251/175; 251/182; 251/288
[51] Int. Cl.² ........................................ F16K 25/00
[58] Field of Search ......... 137/625.17, 454.6, 454.5; 251/175, 182, 288

[56] References Cited
UNITED STATES PATENTS

| | | | |
|---|---|---|---|
| 2,165,096 | 7/1939 | Frechette | 251/182 X |
| 3,032,066 | 5/1962 | Smith | 251/185 X |
| 3,788,601 | 1/1974 | Schmitt | 251/288 X |
| 3,789,870 | 2/1974 | Keller | 137/454.5 |
| 3,814,120 | 6/1974 | Moen | 137/454.6 X |

*Primary Examiner*—Harold W. Weakley
*Attorney, Agent, or Firm*—Warren N. Low; Richard P. Matthews

[57] ABSTRACT

An all plastic valve construction wherein a removable cartridge contains all wearable seal surfaces. A hollow valve body member is threadedly received in an underbody member and provided with a plurality of separate and distinct sealing locations. The underbody member includes an annular support seat for supporting a plastic stem member in a position only slightly below its assembled position to facilitate the assembly of the stem with a handle for turning same. Two different embodiments are included for stop means which limit the amount of rotation of the stem member relative to the hollow valve body member.

12 Claims, 13 Drawing Figures

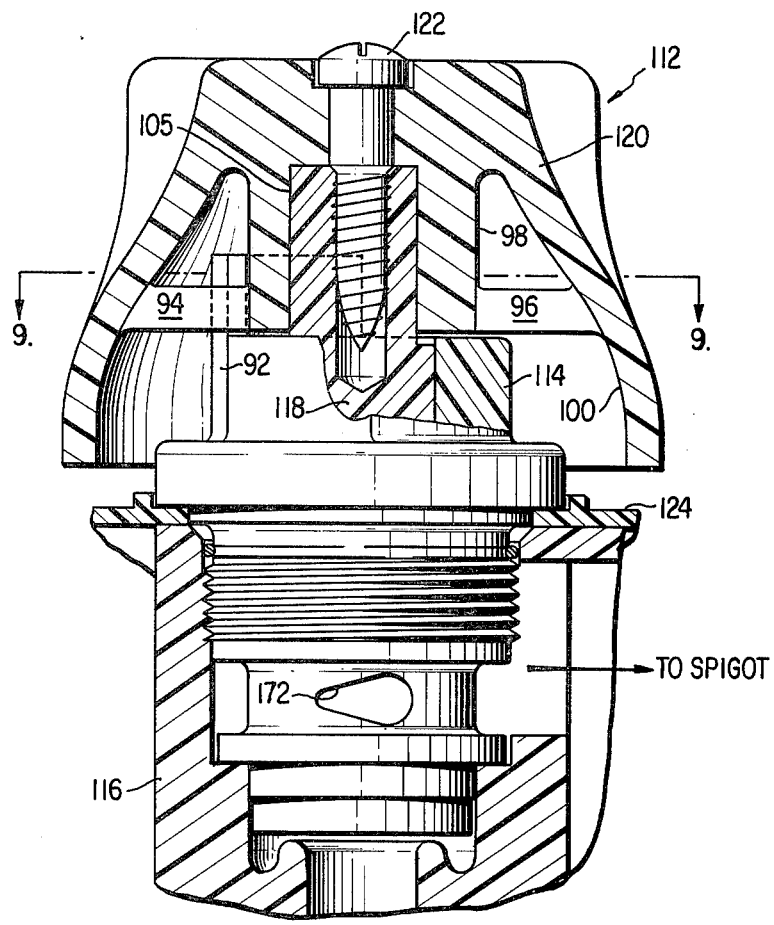
FIG.8
FIG.9
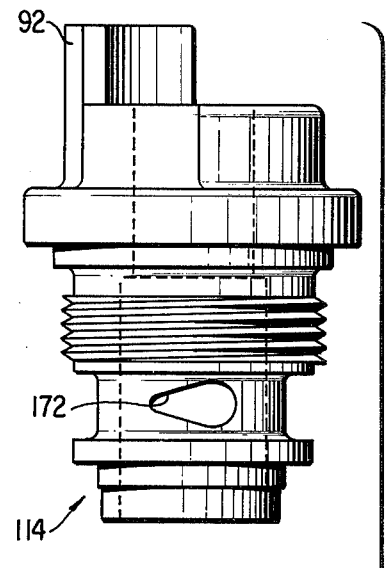
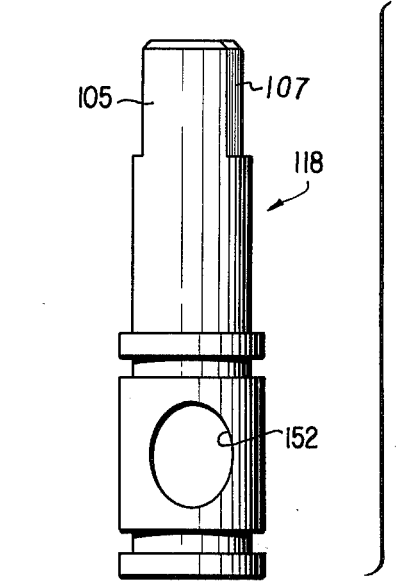
FIG.10

ALL PLASTIC VALVE CONSTRUCTION

This invention relates to an all plastic valve construction and, more particularly, to such a valve construction wherein all wearable seal surfaces may be removed in a unitary cartridge and replaced as necessary.

Heretofore it has been known to employ plastic materials for valve parts, but difficult service and maintenance conditions have arisen in that it is frequently difficult to diassemble the valve to get to and to replace worn parts.

In accordance with the present invention all wearable seal surfaces are removed in a single cartridge assembly whereby the worn parts are easily removed and replaced.

In particular, the valve construction comprises a hollow underbody member into which a hollow valve body member is threadedly received. The hollow valve body member has a dependinng skirt portion which engages a bore of the underbody member in an interference fit. A plastic stem member is mounted for rotation within the hollow valve body member and turned between two stop positions by suitable handle means. All of the wear members are carried by the plastic stem member which may be easily removed to replace the worn elements.

In a preferred form of the invention, the plastic stem member is provided with a non-circular, diametral passageway which is alignable with an aperture in the hollow valve body member. A hollow, resilient seal member is disposed at each end of the passageway through the stem and urged outwardly into sealing position preferably both by the pressure of the water within the faucet and by a compression spring member. As an added feature, the compression spring member and the water pressure provide compensation for wear on the hollow, resilient seal members.

The underbody member is provided preferably with an annular support seat for supporting the plastic stem member in a position only slightly below its assembled position to facilitate assembly of the plastic stem member with the handle. The underbody member preferably has a plurality of concentric bores whereby the valve body member establishes a first seal on one of the bores, a second seal on a shoulder between two of the bores and a final stop on a fixed abutment member.

The inherent advantages and improvements of the present invention will become more readily apparent upon considering the following detailed description of the invention and by reference to the drawings in which:

FIG. 1 ia a fragmenary elevational view taken in vertical cross section showing an assembled valve construction manufactured in accordance with the present invention;

FIG. 8 is a fragmentary elevational view taken partially in vertical cross section showing another modified form of the present invention;

FIG. 9 is a top plan view taken in horizontal cross section along line 9—9 of FIG. 8; and FIG. 10 is an exploded elevational view showing the hollow valve body member and stem member of FIG. 8.

Figure 1:
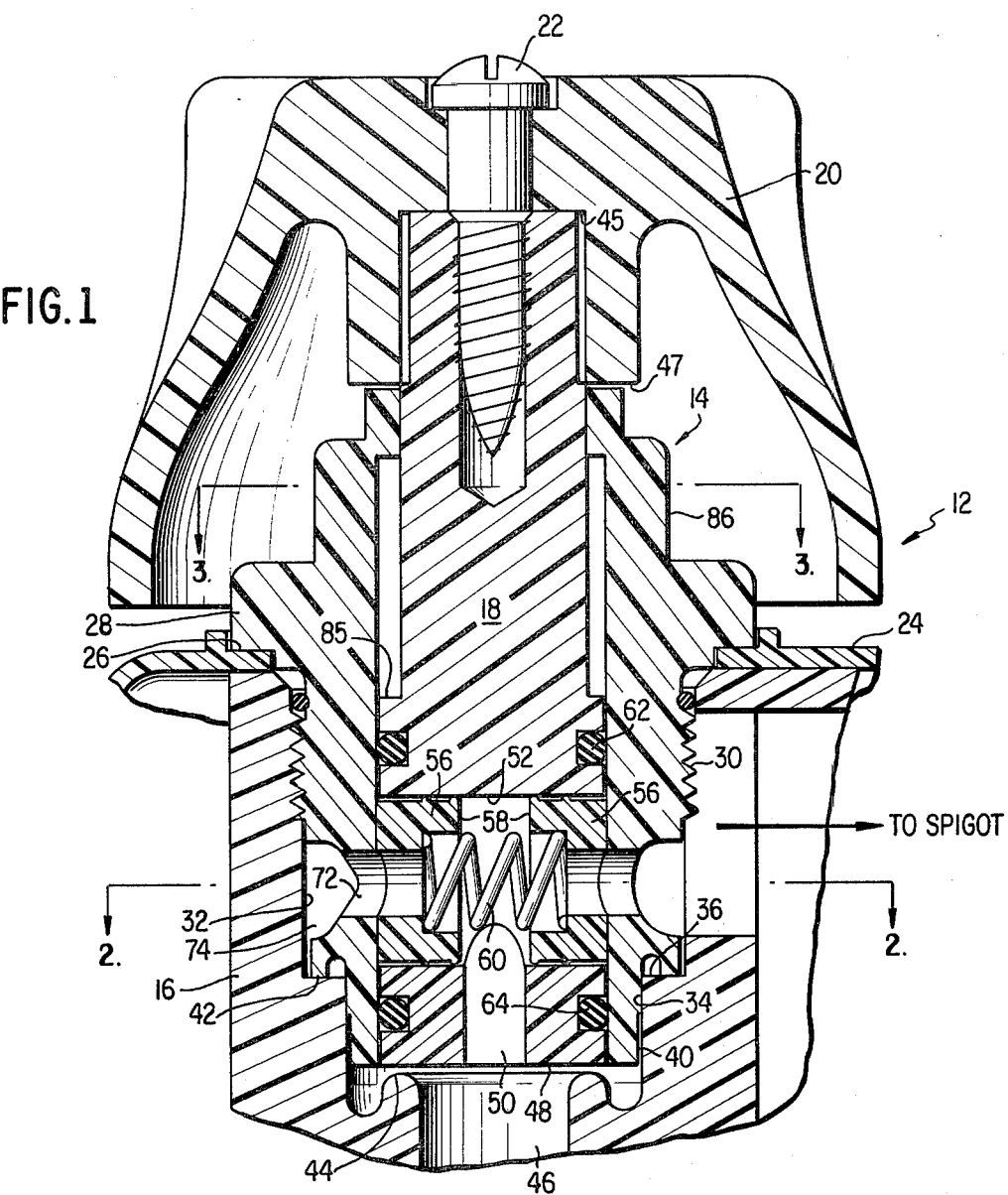
FIG. 1a is a fragmentary elevational view taken in vertical cross section illustrating a modified form of the present invention.

Referring now to FIG. 1 of the drawings, there is illustrated a valve assembly indicated generally at 12 which includes a valve body member or bonnett indicated generally at 14 which is threadedly received within an underbody member 16.

Figure 4:
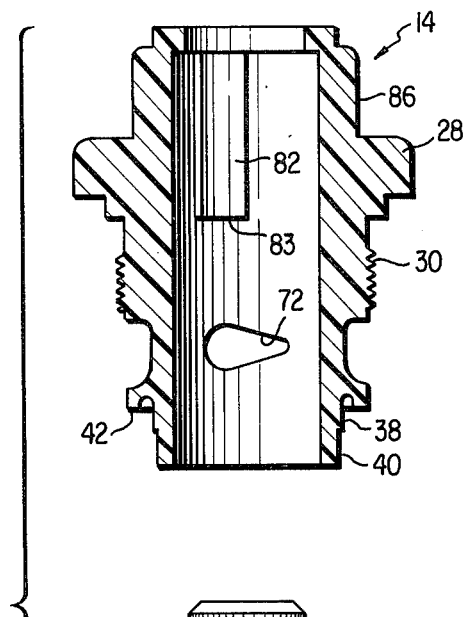
FIG. 4 is an exploded elevational view taken partially in vertical cross section showing the hollow valve body member and the stem member of FIG. 1.
Figure 4:
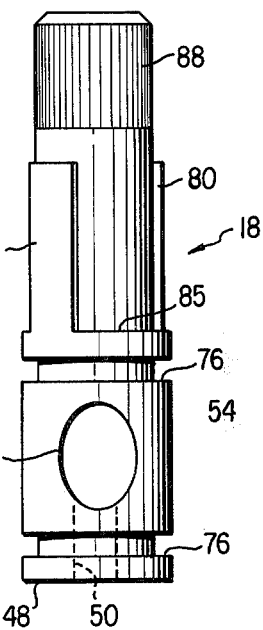

A stem member indicated generally at 18 in FIG. 4 is shown centrally received within valve body member 14 in FIG. 1 and a handle 20 is secured thereto by suitable means such as by a self tapping metal screw 22 for tapping plastic material. All parts described thus far with the exception of screw 22 are preferably made from plastic material such as from Celcon acetal copolymer. The stem member 18 may be made from glass filled acetal copolymer.

A top wall of a plastic cover member 24 such as is more fully described in my U.S. Pat. No. 3,789,870, issued Feb. 5, 1974, is shown to have an upper surface 26 engaged by the undersurface of shoulder 28 with the surface 26 serving as a fixed abutment member.

A valve body member 14 is shown to be provided with threads 30 which engage mating threads on a threaded portion of a first counterbore 32 in underbody member 16. A second counterbore at 34 which is concentric with counterbore 32 is shown in the underbody member 16 establishing a shoulder 36 between the counterbores.

Figure 1A:
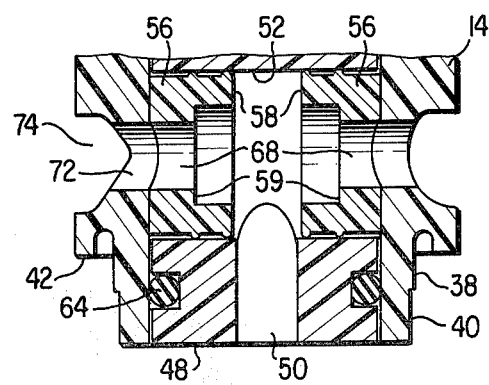

As detailed more particularly in FIGS. 1a and 4, the valve body member 14 has a skirt area which comprises a first interference seal portion 38 forming an interference seal with counterbore 34 and a relieved portion 40 which facilitates the insertion of the valve body member into the counterbore 34 before thread 30 engages the thread in counterbore 34. The valve body member 14 also is provided with a downwardly extending depending flange 42 spaced outwardly from the skirt at 38 which is engageable with shoulder 36 of the underbody member to establish a second seal between the valve body member 14 and underbody member 16.

In the assembly of the valve construction 12 with the valve body member threadedly secured to the underbody member 16, stem member 18 is inserted centrally of the hollow valve body member 14 and some means is necessary to support stem 18 prior to the assembly of handle 20 thereon by means of screw 22. Such a means is provided by an annular support seat 44 the uppermost extent of which is just slightly below the assembled position of the valve. Therefore, as the self-tapping screw 22 is threaded into the bore of stem 18 and tightened against the inside top of the handle broach 45, the stem is pulled upwardly slightly off the annular support seat 44 and concurrently provides clearance between the top of the valve body member and the bottom 47 of the handle broach. Seat 44 also serves as a downside stop for the stem 18 during the valve's usage in that the clearance between seat 44 and the bottom 48 of stem 18 is less than the clearance from the bottom 47 of the handle broach and the top of the valve body member 14.

Support seat 44 is adaptable for use with a compression-type valve such as is shown in my U.S. Pat. No. 3,229,710, issued Jan. 18, 1966. Therefore, it can be seen that the underbody member of the present invention is suitable for use in connection with a number of valve arrangements which results in a substantial saving of inventoried materials.

The underbody 16 is provided with an inlet port at 46 and communicates with a supply port 50 which extends from the bottom 48 of stem 18 vertically upward to a cross port 52 which preferably extends horizontally and diametrally across stem member 18. As can be seen best in FIG. 4, the cross port 52 is non-circular and preferably is provided with a substantially elliptical cross section. As is best seen in FIG. 4, stem member 18 has a section designated 54 which contains the cross port 52. A pair of hollow resilient seal members 56 are preferably disposed at each diametral end of the cross port 52 and provided with a rear face 58 and a seat 59 for a spring 60. Rear face 58 and seat 59 are acted upon by the pressure of the water entering from inlet 46 through supply port 50 and into cross port 52 to urge the seal members 56 into sealing position against the inside of the valve body member. In addition, the water pressure within the bore 68 of seal members 56 tends to spread the seal members 56 into sealing engagement with the inside of cross port 52. Each sealing member 56 has a pair of ridges 66 which are of such a size as to make a slight interference fit with the inside of cross port 52. It is possible to employ a single ridge 66 on each sealing member 56. It has been shown, as illustrated in the FIG. 1a embodiment, that the hollow resilient seal members 56 will be urged outwardly by the water pressure alone to seal against the valve body member so that only a drop or two passes before a seal is effected.

Stem member 18 carries a pair of O-ring seal members 62 and 64 positioned above and below the cross port 52 to further ensure a waterproof connection. The upper O-ring 62 prevents leakage at the top of the valve while the lower O-ring 64 is provided so the pressure of the water is applied to the inside of the resilient seal members 56 for sealing purposes. Also, the O-ring 64 provides a seal that prevents the valve from dripping or leaking in the "off" position.

Figure 5:
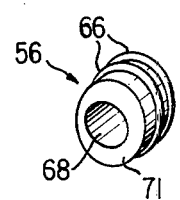
FIG. 5 is a perspective view of one of the hollow resilient seal members of FIG. 1.
Figure 6:
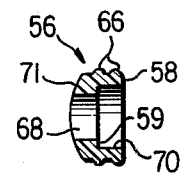
FIG. 6 is a front elevational view taken in vertical cross section of the hollow resilient seal member of FIG. 5.
Figure 7:
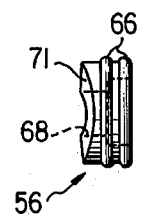
FIG. 7 is a front elevational view of the hollow resilient seal member of FIG. 6.

As can be seen best in FIGS. 5 through 7, the hollow resilient seal members 56 are provided with a pair of ridges or beads 66 which extend annularly around the exterior thereof to effect a seal within the elliptical cross port 52. The hollow resilient seal members 56 have a main bore 68 and a counterbore 79 for reception of the spring 60 therein. A front sealing surface 71 on the hollow resilient seal members 56 seals against the inside surface of the cylindrical bore of the hollow valve body member 14 which is provided with an aperture or port as best seen at 72 in FIG. 4. It should be noted that the front sealing surface 71 of each hollow, resilient sealing member 56 has a radius that is the same as the radius of the bore of valve body member 14. Furthermore, the elliptical outer diameter of the sealing members 56 is required so that the sealing faces 71 correspond with the bore of the valve body member 14 and are oriented properly therewith in assembly to assure a seal between the sealing faces 71 and the inside bore of the valve body member 14.

From the foregoing it can be seen that water entering the faucet construction through inlet 46 in the underbody member passes through supply port 50 into the elliptical cross port 52, then horizontally through both the hollow resilient seal members 56 and when suitably aligned through a pair of apertures 72 in the hollow valve body member 14 into a chamber 74 and then to a spigot construction as indicated by the arrow in FIG. 1, and as is more fully disclosed in my issued U.S. Pat. No. 3,789,870, mentioned previously.

Figure 2A:
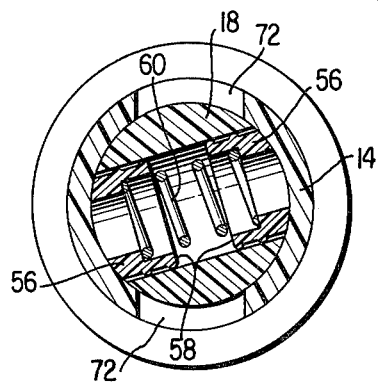
FIGS. 2a and 2b are top plan views taken in horizontal cross section along line 2—2 of FIG. 1 illustrating two different operating positions of the valve of FIG. 1.
Figure 3A:
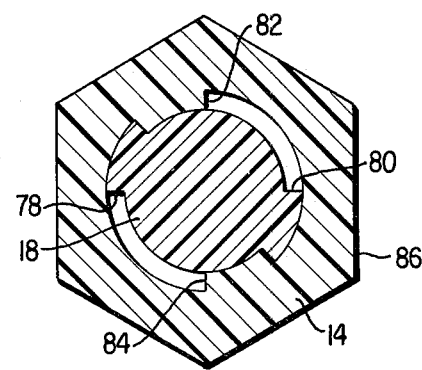
FIGS. 3a and 3b are top plan views taken in horizontal cross section along line 3—3 of FIG. 1 illustrating two different operating positions of the valve of FIG. 1.
Figure 2B:
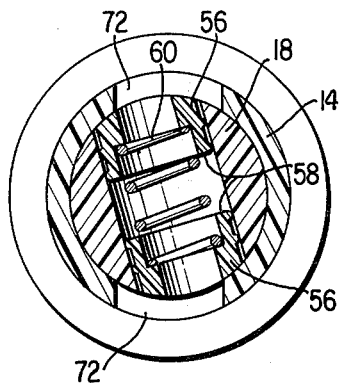
Figure 3B:
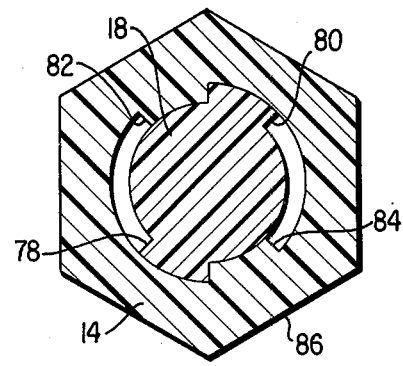

Referring now to FIG. 4, the stem member 18 is shown to be provided with undercut portions at 76 to receive the O-rings 62 and 64 of FIG. 1 and the stem is also provided with external stops 78 and 80 which can also be seen in FIGS. 3a and 3b. The valve body member 14 is provided with internal stops 82 and 84 as seen in FIGS. 4, 3a and 3b, with the full "off" position being shown in 3a and the full "on" position shown in FIG. 3b. The corresponding positions for the hollow resilient seal members 56 vis-a-vis the apertures 72 in the valve body member 14 are illustrated in the FIG. 2a position ("off" position) and the FIG. 2b position ("on" position). The position of internal stops 82,84 relative to external stops 78,80 is such that seal members 56 are brought into proper registration with apertures 72 in valve body member 14.

The bottom surface 83 of each of the internal stops 82 and 84 bears against a shoulder 85 on stem member 18 thereby preventing the stem member from being pushed up and out by the pressure of water entering port 46.

As can be seen best in FIGS. 3a and 3b, the upper portion of valve body member 14 is hexagonal in shape at 86 to facilitate the tightening of the valve body member into the underbody member 16. Similarly, reference to FIG. 4 shows that the upper portion of stem member 18 may be provided with a toothed spline at 88 for retention of handle 20.

In operation, the handle 22 causes the stem 18 to rotate thereby bringing the hollow resilient seal members 56 into and out of complete registration with the aperture 72 in the valve body member 14 as illustrated in the FIG. 2a and FIG. 2b positions going from the "off" position to the "on" position, respectively. The shape of the aperture 72 is made generally tear-shaped so that the volume of water going out of the valve can be carefully controlled especially at the low volume positions in which the smaller opening of the aperture is in registry with the openings through the hollow resilient seal members 56. Since all of the water flowing upwardly in FIG. 1 from 46 through 50 and then through the hollow resilient seal members 56 must pass through the spring 60, the spring 60 itself may be used as a filter member to prevent large articles of debris from clogging the valve member and heading toward the spigot. The number of coils of the spring 60 may be changed to vary the spacing between the coils and thereby be able to filter out smaller articles of debris. There must be a sufficient area between the coils so as not to restric the flow of water unduly relative to the combined areas of the two lateral ports of apertures 72.

It is possible to use a single hollow resilient seal member 56 with a spring provided that the opening therethrough is sufficiently large to handle the volume of water which is entering through supply port 50. In such a construction, it is not necessary that the supply port 50 be located along the longitudinal axis of stem 18. For example, looking at FIG. 1, it is possible to move the supply port to the right in that figure and, if desired, have the water enter behind spring 60 and pass axially therethrough and through the left-hand seal member 56. Also in this construction, the right-hand seal member would not be used and the stem member 18 would be formed to provide a seat for spring 60. Because of the need to handle all of the water which enters through supply port 50, it is preferable to use two hollow resilient seal members 56 since the openings therethrough need not be so great in each. The FIG. 1a embodiment represents the use of hollow resilient seal members 56 without a spring 60 urging them toward their sealing relation against the inside of valve body member 14. It has been found that water pressure alone is sufficient to drive the seal members 56 outwardly although a small drip or two will occur when the faucet is originally turned on.

Reference to FIGS. 8 through 10 illustrates a modified arrangement for the stop members used to limit the amount of rotation of the plastic stem member relative to the hollow valve body member. In these figures members which have been shown previously are indicated by a numeral 100 plus the number appearing in FIGS. 1 through 7. In these figures an upstanding stop member is illustrated at 92 on the valve body member 114 of the valve assembly 112 which is received in the underbody member 116 as in the previous embodiment. Brace members 94 and 96 which extend from the hub 98 of the handle 120 radially outwardly to the inside surface 100 of handle 120 serve to limit the amount of rotation which is permissible for the handle before it engages one side or the other of the upstanding stop member 92 as is indicated by the full and dashed lines in FIG. 9. In these figures the selftapping screw is illustrated at 122 and the top wall of a plastic cover member 124. Numeral 152 designates the horizontally extending elliptical cross bore through stem member 118 and 172 designates the aperture in the valve body member 114.

Means must be provided for orienting the handle with respect to the stem member in this form of the invention. To that end, an anomalous rounded portion 105 is provided on the top of stem member 118 and a corresponding shape molded within hub 98 so that the handle and the stem member may be assembled in only one relative position. The position of stop member 92 on the valve body member is controlled relative to the position of brace members 94, 96 and relative to a flat 107 on stem member 118 so that the seal members within the valve body member 114 are in proper registration with the apertures 172 in the valve body member. In all other respects, the embodiment of FIGS. 8 through 10 are identical with the embodiment shown previously.

As will be noted, all forms of the invention discussed herein utilize a single cartridge the removal of which facilitates the inspection and replacement, if necessary, of all worn parts. Thus it is only necessary to remove self tapping screw 22, lift off handle 20 thereby releasing stem member 18. The stem member will drop downwardly but will be supported on the annular support seat 44 from which the stem member may simply be lifted out and the wear parts constituting the hollow resilient seal members 56 and O-rings 62 and 64 may readily be inspected and removed, if necessary.

While presently preferred embodiments of the invention have been illustrated and described, it will be recognized that the invention may be otherwise variously embodied and practiced within the scope of the claims which follow.

What is claimed is:
1. A valve construction comprising:
   a. a hollow underbody member,
   b. a hollow valve body member threadedly received in a first bore of said underbody member,
      1. said hollow valve body member having a depending skirt portion insertable into a second bore of said underbody member and establishing an interference fit therewith,
      2. said hollow valve body member further having an aperture communicating with spigot means,
   c. a plastic stem member mounted for rotation within said hollow valve body member,
   d. handle means for rotating said plastic stem member,
      1. said stem member being provided with a supply port and supply passageway in fluid communication with said underbody member and at least one laterally extending passageway to an exit port,
      2. said exit port of said stem member being alignable with said aperture in said hollow valve body member,
   e. at least one hollow resilient seal member received in said laterally extending passageway,
   f. and means for urging said hollow resilient seal member toward the port adjacent said hollow valve body member.

2. A valve construction as defined in claim 1, including stop means for limiting the amount of rotation of said plastic stem member relative to said hollow valve body member and for bringing said laterally extending passageway in said stem member into proper registration with said aperture in said hollow valve body member.

3. A valve construction as defined in claim 2, wherein said stop means includes fixed stop means carried internally by said hollow valve body member and movable stop means carried externally by said plastic stem member.

4. A valve construction as defined in claim 2, wherein said stop means includes fixed stop means carried externally by said hollow valve body member and movable stop means carried internally by said handle means.

5. A valve construction as defined in claim 1, wherein said laterally extending passageway extends diametrically across said plastic stem member and said valve includes a hollow resilient seal member at each diametral end.

6. A valve construction as defined in claim 5, wherein a single compression spring is included in the means for urging each hollow resilient seal member toward its adjacent port.

7. A valve construction as defined in claim 1, wherein said laterally extending passageway and said hollow resilient seal member therein are non-circular.

8. A valve construction as defined in claim 7, wherein said laterally extending passageway and said hollow resilient seal member therein are substantially elliptical in cross section.

9. A valve construction as defined in claim 1, wherein said underbody member includes an annular support seat for supporting said plastic stem member in a position only slightly below its assembled position to facilitate assembly of said plastic stem member with said handle means and for limiting downward movement of said plastic stem member during use.

10. A valve construction as defined in claim 1, wherein said first and second bore means of said underbody member define a shoulder therebetween and said hollow valve body member is provided with a flexible annular flange means engageable with said shoulder as a second sealing surface.

11. A valve construction as defined in claim 10, wherein said hollow valve body member is provided with a shoulder which extends above said underbody member and which is engageable with a fixed abutment means as a final stop for said hollow valve body member.

12. A valve construction as defined in claim 1, wherein said depending skirt portion of said hollow valve body member has a lower annular surface which does not establish an interference fit with said second bore of said underbody member but which facilitates the easy insertion of said valve body member into the underbody member during the assembly thereof.

* * * * *